(12) United States Patent
Weh et al.

(10) Patent No.: US 11,072,317 B2
(45) Date of Patent: Jul. 27, 2021

(54) BRAKE FLUID RESERVOIR FOR A HYDRAULIC BRAKE ACTUATOR OF VEHICLES

(71) Applicant: Robert Bosch GmbH, Stuttgart (DE)

(72) Inventors: Andreas Weh, Sulzberg (DE); Andres Molto Ruiz, Barcelona (ES); Carles Gandia Verge, Senlis (FR)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/645,544

(22) PCT Filed: Aug. 10, 2018

(86) PCT No.: PCT/EP2018/071776
§ 371 (c)(1),
(2) Date: Mar. 9, 2020

(87) PCT Pub. No.: WO2019/057391
PCT Pub. Date: Mar. 28, 2019

(65) Prior Publication Data
US 2020/0262405 A1 Aug. 20, 2020

(30) Foreign Application Priority Data
Sep. 21, 2017 (ES) ............................. ES201731138

(51) Int. Cl.
*B60T 11/22* (2006.01)
*B60T 11/26* (2006.01)

(52) U.S. Cl.
CPC .............. *B60T 11/22* (2013.01); *B60T 11/26* (2013.01)

(58) Field of Classification Search
CPC ......... B60T 11/22; B60T 11/26; B60T 11/228
(Continued)

(56) References Cited

U.S. PATENT DOCUMENTS 4,422,293 A * 12/1983 Ewald .................. B60T 13/145
60/547.1
2006/0157141 A1 7/2006 von Hayn et al.
(Continued)

FOREIGN PATENT DOCUMENTS

DE 1455988 A1 6/1969
DE 4115063 A1 11/1992
(Continued)

OTHER PUBLICATIONS

International Search Report for PCT/EP2018/071776, dated Dec. 5, 2018.

*Primary Examiner* — Abiy Teka
*Assistant Examiner* — Daniel S Collins
(74) *Attorney, Agent, or Firm* — Norton Rose Fulbright US LLP; Gerard Messina

(57) ABSTRACT

A brake fluid reservoir for a hydraulic brake actuator of vehicles, which is coupled at its lower base to the upper side of the hydraulic module of the hydraulic brake actuator. The reservoir includes at its lower base a mechanical anchor, which fastens it to the hydraulic module and includes a single anchoring point, which is centered at the lower base of the reservoir in the longitudinal direction. The reservoir also includes several connecting nipples, which may be connected to the hydraulic module with the aid of sealing washers, which generate a torque on the reservoir in relation to the mechanical anchor. The reservoir includes a compensation seal, which is situated in a receptacle of its lower base in such a position that it generates an additional torque in relation to the mechanical anchor, which compensates for the torque generated by the plurality of connecting nipples.

4 Claims, 7 Drawing Sheets

(58) Field of Classification Search
USPC .......................................................... 60/585
See application file for complete search history.

(56) References Cited

U.S. PATENT DOCUMENTS

2007/0009321 A1   1/2007  Yasui
2007/0125080 A1   6/2007  Bourlon et al.
2018/0265060 A1*  9/2018  Maruo .................. B60T 8/3685

FOREIGN PATENT DOCUMENTS

EP    2641799 A1   9/2013
FR    2017041 A1   5/1970
FR    2936476 A1   4/2010

* cited by examiner

BRAKE FLUID RESERVOIR FOR A HYDRAULIC BRAKE ACTUATOR OF VEHICLES

FIELD

The present invention is in the technical field of hydraulic brake actuators of vehicles and, more precisely, the brake fluid reservoirs, which are coupled to the hydraulic module of the brake actuator. The present invention in particular relates to a brake fluid reservoir for a hydraulic brake actuator of vehicles including a mechanical anchor, centered at the lower base of the reservoir in the longitudinal direction for fastening on the hydraulic module, which includes a plurality of nipples for connection to the hydraulic module, which generate a torque on the reservoir in relation to the mechanical anchor. Moreover, the reservoir includes a compensation seal, which generates an additional torque on the reservoir in relation to the mechanical anchor, which compensates for the torque generated by the nipples for the connection to the hydraulic module.

BACKGROUND INFORMATION

Presently, the hydraulic brake actuators for vehicles are intended to integrate the brake fluid reservoir directly into the hydraulic module, which includes the main brake cylinder and the brake pump having an electric actuator, or to connect it thereto.

The brake fluid reservoir is situated above the hydraulic module and is coupled at its lower base directly to the upper side of the hydraulic module. This arrangement enables the direct flow of the brake fluid from the reservoir to the main brake cylinder and to the brake pump having an electric actuator and facilitates the filling of the brake fluid reservoir in the vehicle assembly line at the same time.

The brake fluid reservoir is provided on its lower base with various connection nipples or nozzles for connecting the brake fluid reservoir to the various brake fluid chambers independent of the hydraulic module. In specific cases, two nipples are required, although generally three nipples are required, two for the primary chamber and the secondary chamber of the main brake cylinder and a further one for the chamber of the brake pump having an electric actuator.

The reservoir has to be fastened on the hydraulic module to avoid the movement and disconnection thereof. This fastening is carried out by anchoring means which have to fulfill various functions. Primarily, they have to hold the reservoir during the entire service life of the vehicle in the correct installation position above the hydraulic module. The anchoring means additionally have to withstand the strains resulting during the phase of filling the brake fluid in the vehicle assembly line and enable simple and rapid removal to carry out maintenance, repair, and replacement work.

Presently, these anchoring means are made up of two different anchoring points on the lower base of the reservoir, which are implemented by means of two pins which fasten the reservoir on the hydraulic module and hold it motionless in equilibrium above the hydraulic module at the same time. However, this present approach has the disadvantage of increased overhead costs due to the two pins and the machine manufacturing of the boreholes and threads which are required for fastening the two pins in the hydraulic module.

One possible approach to this problem would be the implementation of a single anchoring point centered on the lower base of the reservoir in the longitudinal direction with the aid of a single pin, which is fastened by one or more tabs of the lower base of the reservoir in the transverse direction on the hydraulic module.

These anchoring means on the basis of a single anchoring point with the aid of a pin centered on the lower base of the reservoir in the longitudinal direction have the problem, however, that it is not sufficient to hold the reservoir motionless in equilibrium above the hydraulic module, since the sealing washers of the nipples exert a torque on the reservoir in relation to the anchor, around which it sets the reservoir into rotation. Moreover, the force which is applied during the phase of the injection of the brake fluid to the filling nozzle of the reservoir increases the torque exerted on the reservoir, whereby the rotation thereof is strengthened.

To solve this problem, the anchoring point with the aid of the pin could be combined with a clip fastening of the base of the reservoir on the hydraulic module. However, this approach is also not effective, since the reservoir is manufactured from propylene, which is not a material suitable for clip fastening due to its low rigidity. Moreover, complementary clip fastening means would have to be manufactured by machine in the hydraulic module, which would increase the manufacturing costs.

A brake fluid reservoir for a hydraulic brake actuator of vehicles is therefore desirable, which provides complete and simple fastening thereof on the hydraulic module without the disadvantages of the already existing systems according to the related art.

SUMMARY

An example embodiment of the present invention may solve the existing problems of the related art with the aid of an example brake fluid reservoir for a hydraulic brake actuator of vehicles.

The brake fluid reservoir is coupled at its lower base to the upper side of the hydraulic module of the hydraulic brake actuator.

The reservoir includes at its lower base a mechanical anchor for fastening on the hydraulic module. This mechanical anchor includes a single anchoring point centered at the lower base of the reservoir in the longitudinal direction.

According to one preferred specific embodiment of the present invention, the anchoring point is implemented on the basis of a pin which is fastened in the transverse direction at the hydraulic module by at least one fastening tab which is arranged at the lower base of the reservoir.

Moreover, the reservoir includes a plurality of connecting nipples, which may be connected with the aid of sealing washers to the hydraulic module, for the passage of the brake fluid of the reservoir to the various fittings of the hydraulic module at each of the hydraulic chambers independent of the brake actuator. In specific cases, two nipples are required, although the reservoir preferably includes three connecting nipples. A first connecting nipple connects the reservoir to the first fitting of the hydraulic module at the primary chamber of the main brake cylinder. A second connecting nipple connects the reservoir to the second fitting of the hydraulic module at the secondary chamber of the main brake cylinder. And a third connecting nipple connects the reservoir to the third fitting of the hydraulic module at the chamber of the brake pump.

These connecting nipples including the sealing washers, which they require for their correct functioning, generate a torque on the reservoir in relation to the mechanical anchor, which has the tendency to rotate the reservoir around the mechanical anchor.

To avoid this rotation of the reservoir and a displacement of its position above the hydraulic module, the reservoir includes a compensation seal, which is situated in a receptacle in its lower base in such a position that it generates an additional torque on the reservoir in relation to the mechanical anchor, which compensates for the torque generated by the plurality of connecting nipples in such a way that the total torque is zero and does not cause rotation in relation to the mechanical anchor, whereby the movement is avoided and the reservoir is therefore held in the installation position above the hydraulic module.

The reservoir preferably includes at least one fastening point of the compensation seal, which is situated in the receptacle thereof, to support and fasten the compensation seal. In this way, the rotation of the seal in its receptacle is avoided, whereby possible play, malfunction of the seal, and even the possible escape thereof from its receptacle are avoided.

Although the compensation seal may have various shapes, it is preferably identical to that of the connecting nipple and is situated in the receptacle in the inverse position to the connecting nipples in such a way that instead of protruding beyond the lower base of the reservoir, like the connecting nipples, it remains inside the reservoir, whereby having to manufacture complementary recesses or receptacles in the upper side of the hydraulic module is avoided. The compensation seal being identical to the connecting nipples facilitates the manufacturing thereof.

BRIEF DESCRIPTION OF THE DRAWINGS

One specific example embodiment of the present invention is described illustratively and non-restrictively hereafter with reference to a series of figures to facilitate the understanding of the present invention.

Figure 1:
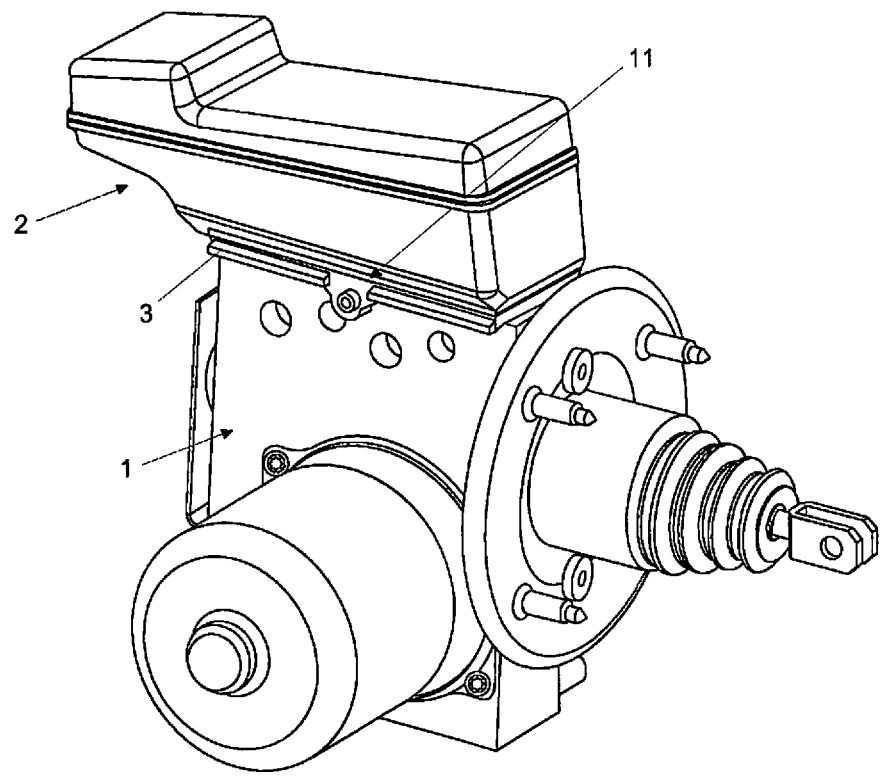
FIG. 1 shows a perspective view of a reservoir according to the related art situated above a hydraulic module of a hydraulic brake actuator of a vehicle.
Figure 2:
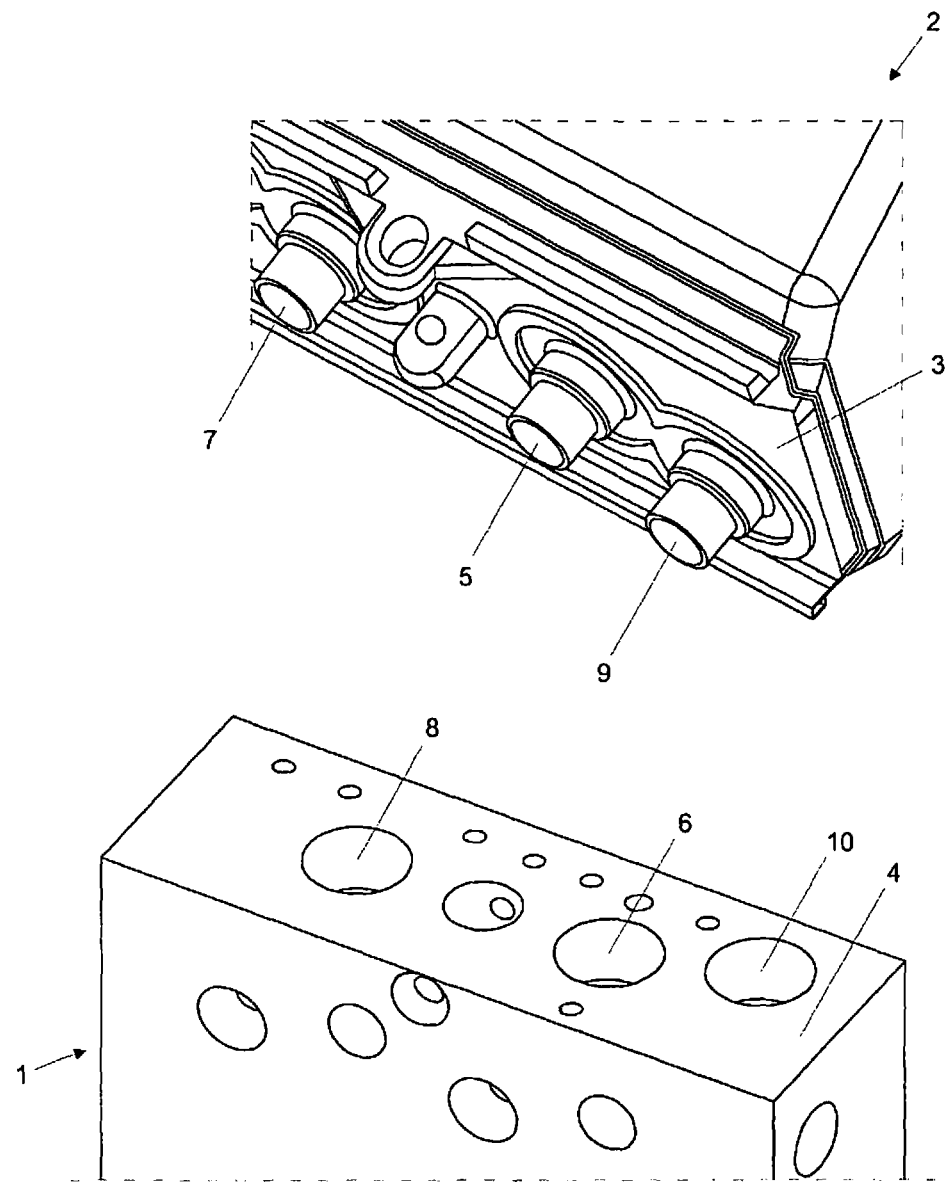
FIG. 2 schematically shows the connection of the connecting nipples to the hydraulic module of the reservoir of the related art from FIG. 1.
Figure 3A:
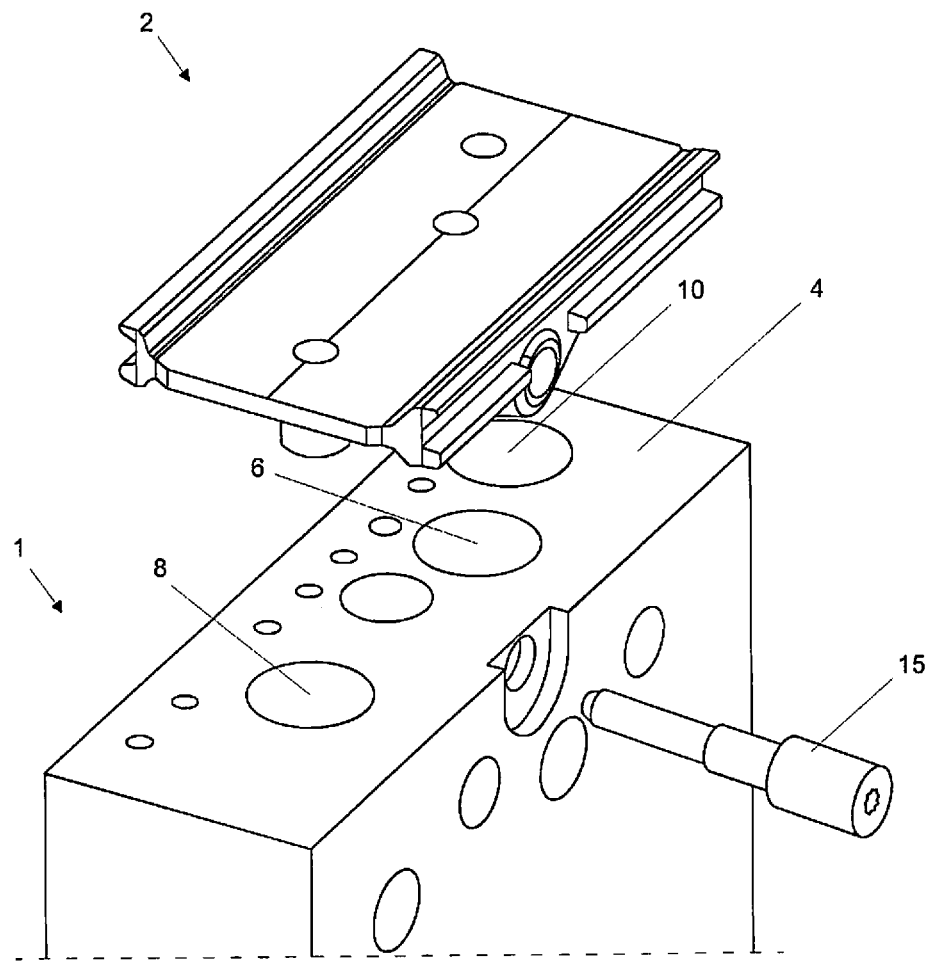
FIGS. 3a and 3b show a perspective view of one specific embodiment of the mechanical anchor of the reservoir of the related art of the above figures.
Figure 3B:
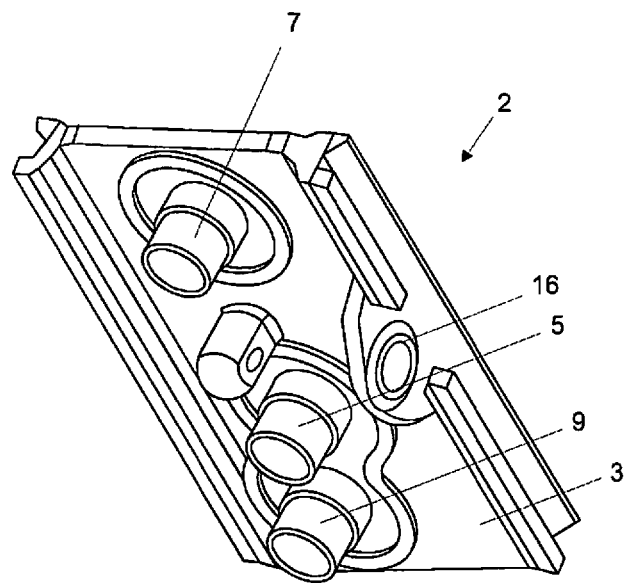
Figure 3B:
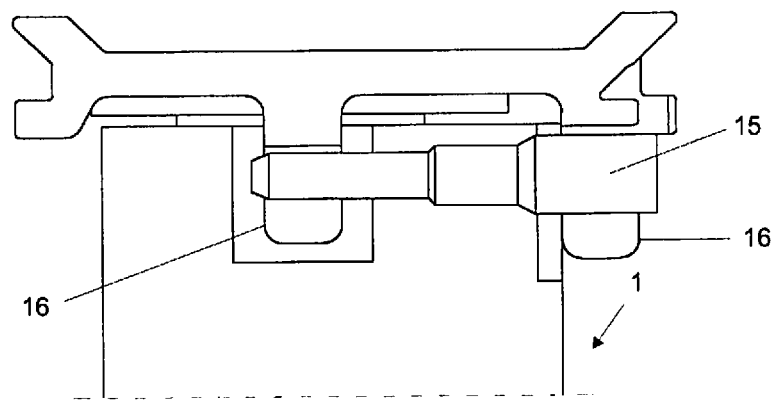

Reference is made to a set of elements in these figures, these elements being the following:
1. hydraulic module of a hydraulic brake actuator
2. brake fluid reservoir
3. lower base of the reservoir
4. upper side of the hydraulic module
5. first connecting nipple of the reservoir
6. first fitting of the hydraulic module to the primary chamber of the main brake cylinder
7. second connecting nipple of the reservoir
8. second fitting of the hydraulic module to the secondary chamber of the main brake cylinder
9. third connecting nipple of the reservoir
10. third fitting of the hydraulic module to the chamber of the brake pump
11. mechanical anchor of the reservoir
12. compensation seal of the reservoir
13. receptacle of the compensation seal
14. fastening point of the compensation seal
15. pin of the mechanical anchor of the reservoir
16. fastening tabs for the pin of the mechanical anchor sealing washer
17. sealing washer

DETAILED DESCRIPTION OF EXAMPLE EMBODIMENTS

The subject matter of the present invention is a brake fluid reservoir for a hydraulic brake actuator of vehicles.

As the figures show, brake fluid reservoir 2 is designed for coupling at its lower base 3 to upper side 4 of hydraulic module 1 of the hydraulic brake actuator.

Reservoir 2 includes at its lower base 3 a mechanical anchor 11 for its fastening to hydraulic module 1. Mechanical anchor 11 includes a single anchoring point centered at lower base 3 of reservoir 2 in the longitudinal direction.

The figures show how mechanical anchor 11 of reservoir 2 preferably includes a pin 15, which is fastened in the transverse direction to hydraulic module 1 by at least one fastening tab 16 (which could also be two or more), which is situated at lower base 3 of reservoir 2.

After the present invention has been described comprehensively, it is to be noted that the above-described specific embodiments are receptive to modifications in detail, presuming that they do not change the foundations and the essence of the present invention.

As is apparent in the figures, the reservoir additionally includes a plurality of nipples 5, 7, 9, which may be connected with the aid of sealing washers (see, e.g., FIG. 7, sealing washer 17) to hydraulic module 1, for the passage of the brake fluid of the reservoir to the various fittings of hydraulic module 1 on each of the chambers independent of the brake actuator.

According to one preferred specific embodiment, which is shown in the figures, reservoir 2 includes three connecting nipples 5, 7, 9. A first connecting nipple 5 connects reservoir 2 to first fitting 6 of hydraulic module 1 on the primary chamber of the main brake cylinder. A second connecting nipple 7 connects reservoir 2 to second fitting 8 of hydraulic module 1 on the secondary chamber of the main brake cylinder. And a third connecting nipple 9 connects reservoir 2 to third fitting 10 of hydraulic module 1 on the chamber of the brake pump.

Figure 4A:
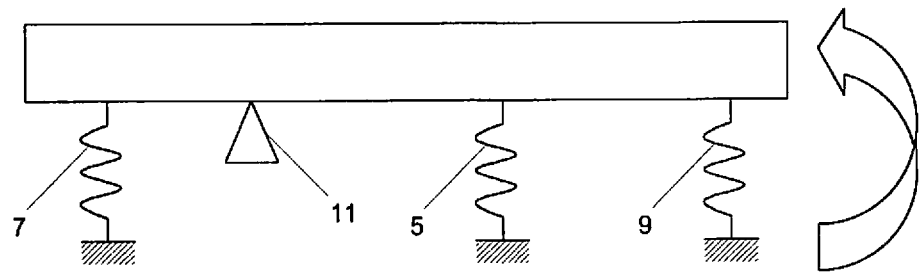
FIGS. 4a and 4b schematically show the torque which is exerted by the connecting nipples on the reservoir of the related art of the above figures.
Figure 4B:
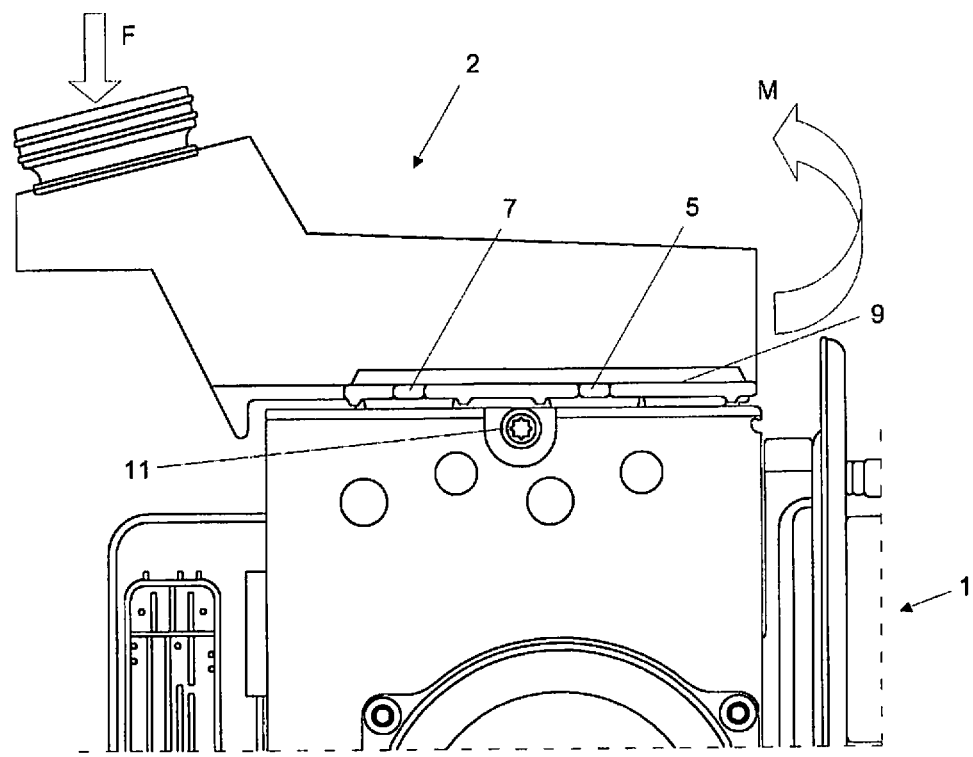
Figure 5:
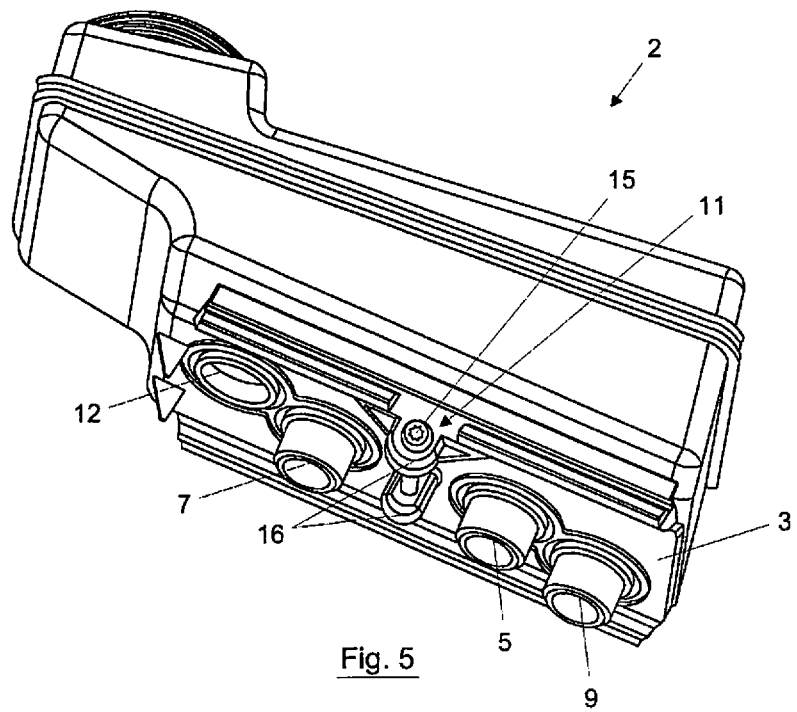
FIG. 5 is a perspective view of one specific embodiment of a reservoir, which is the subject matter of the present invention, and shows the compensation seal.

These nipples 5, 7, 9 generate a torque on reservoir 2 in relation to mechanical anchor 11, as is schematically apparent in FIGS. 4a and 4b. This torque has the tendency to rotate reservoir 2 around mechanical anchor 11, which may result in instability and displacement of reservoir 2 from its position above hydraulic module 1.

To avoid this rotation of reservoir 2, according to the present invention, it includes a compensation seal 12, which is situated in a receptacle 13 of its lower base 3 in such a position that it generates an additional torque on reservoir 2 in relation to mechanical anchor 11, which compensates for the torque generated by connecting nipples 5, 7, 9.

Figure 6:
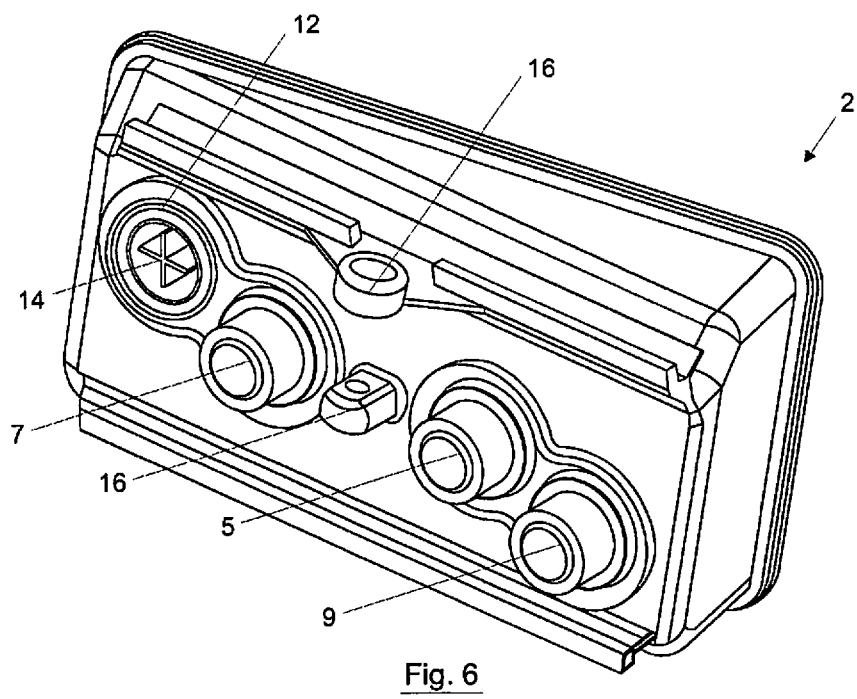
FIG. 6 is a perspective view of one specific embodiment of a reservoir, which shows the compensation seal and the fastening point thereof.
Figure 7:
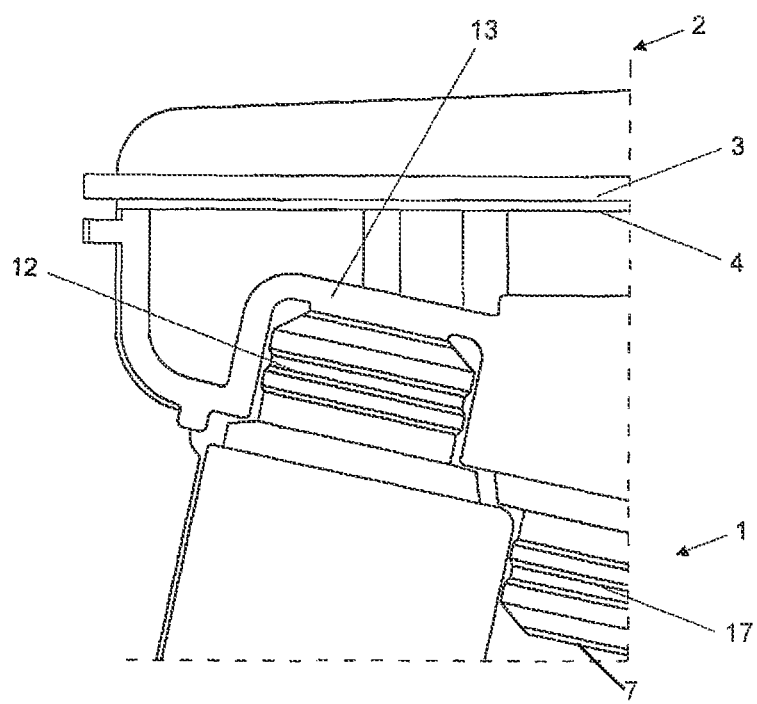
FIG. 7 shows a detail of a compensation seal in its receptacle in the reservoir.

As is apparent in FIG. 6, reservoir 2 includes, according to one preferred specific embodiment of the present invention, at least one fastening point 14 of compensation seal 12 to support and fasten compensation seal 12 situated in receptacle 13 thereof, to thus avoid its rotation within the receptacle. Compensation seal 12 is preferably identical to those of connecting nipples 5, 7, 9, although it is situated in receptacle 13 in inverted position relative to that of connecting nipples 5, 7, 9. In this way, compensation seal 12 remains in the interior, instead of protruding beyond lower base 3 of reservoir 2, as connecting nipples 5, 7, 9 do, whereby machine-manufactured recesses or additional receptacles in upper side 4 of hydraulic module 1 are avoided. Moreover, the fact that they are identical to those of connecting nipples 5, 7, 9 facilitates the manufacturing thereof. FIG. 7 shows this compensation seal in inverted position to that of connecting nipples 5, 7, 9 in detail.

What is claimed is:

1. A brake fluid reservoir for a hydraulic brake actuator of a vehicle, which is configured to couple at a lower base of the brake fluid reservoir to an upper side of a hydraulic module of the hydraulic brake actuator, the brake fluid reservoir comprising:
    a mechanical anchor, at the lower base, configured to fasten the brake fluid reservoir to the hydraulic module and including a single anchoring point, which is centered at the lower base of the brake fluid reservoir in a longitudinal direction;
    a plurality of connecting nipples, at the lower base, configured to be connected to the hydraulic module using respective sealing washers mounted on the connecting nipples, the connecting nipples together with the respective sealing washers generating a torque on the reservoir in relation to the mechanical anchor;
    a compensation seal, situated in a receptacle of the lower base in such a position that the compensation seal generates an additional torque on the reservoir in relation to the mechanical anchor, which compensates for the torque generated by the plurality of connecting nipples together with the respective sealing washers;
    wherein the compensation seal is identical to the connecting nipples together with the respective sealing washers, and is situated in the receptacle in inverted position relative to that of the connecting nipples.

2. The brake fluid reservoir as recited in claim 1, further comprising:
    at least one fastening point of the compensation seal situated in the receptacle, the at least one fastening point configured to support and fasten the compensation seal.

3. The brake fluid reservoir as recited in claim 1, wherein the connecting nipples include:
    a first connecting nipple which is configured to connect to a first fitting of the hydraulic module on a primary chamber of a main brake cylinder;
    a second connecting nipple which is configured to connect to a second fitting of the hydraulic module on a secondary chamber of the main brake cylinder; and
    a third connecting nipple configured to connect to a third fitting of the hydraulic module on a chamber of a brake pump.

4. The brake fluid reservoir as recited in claim 1, wherein the mechanical anchor of the reservoir includes:
    a pin configured to be fastened in a transverse direction at the hydraulic module by at least one fastening tab, which is situated at the lower base of the reservoir.

* * * * *